Nov. 28, 1939.  L. R. SMITH  2,181,822
VEHICLE LOCK
Filed Sept. 14, 1938  4 Sheets-Sheet 1

INVENTOR
Louis R. Smith
BY Dyce & Kirchner
ATTORNEY

Nov. 28, 1939.  L. R. SMITH  2,181,822
VEHICLE LOCK
Filed Sept. 14, 1938  4 Sheets-Sheet 2

Nov. 28, 1939.  L. R. SMITH  2,181,822

VEHICLE LOCK

Filed Sept. 14, 1938  4 Sheets-Sheet 3

INVENTOR
Louis R. Smith
Dyer & Kirchner
ATTORNEY

INVENTOR
BY Louis R. Smith
Dyer & Kirchner
ATTORNEY

Patented Nov. 28, 1939

2,181,822

UNITED STATES PATENT OFFICE 2,181,822

VEHICLE LOCK

Louis R. Smith, San Diego, Calif., assignor of twenty per cent to Bernhart O. Larsen, twenty per cent to Christian A. Larsen, and thirty per cent to Goldie V. Smith, all of San Diego, Calif.

Application September 14, 1938, Serial No. 229,977

13 Claims. (Cl. 123—146.5)

The invention relates to locking and latching means, particularly such as are adapted to be used on motor vehicles for controlling the operability of the power plant and access to the fuel supply therefor.

Gasoline propelled vehicles are commonly provided with a motor ignition circuit and a fuel tank, both of well understood construction, arrangement and functions. It is customary to include in the ignition circuit a lock controlled switch to prevent unauthorized starting of the motor. In addition, various attempts have been made to provide the fuel tank closure with some sort of lock or latch for preventing unauthorized removal of the fuel, theft of the closure, or accidental misplacement thereof.

A purpose of the present invention is to provide means for accomplishing the foregoing objects, together with others, which may be briefly summarized as follows:

In most localities the operator of a motor vehicle is required by law to maintain the motor at rest while gasoline is being supplied to the fuel tank. By my present invention violation of such laws is made mechanically impossible, since the invention permits the fuel tank closure to be removed only while the ignition circuit is open and maintains the ignition circuit open as long as the closure remains removed. Furthermore, this characteristic or capacity of the invention requires the closure to be restored to closed position before the ignition circuit can be closed; hence the vehicle cannot be driven away from a filling station or the like and the tank closure left inadvertently behind, nor can the vehicle be driven away with the tank closure in any but fully closed position. Accordingly, loss of fuel by splashing out of an unclosed tank during driving of the vehicle is completely prevented.

The invention therefore includes means cooperating with the ignition circuit and a fuel tank closure for preventing functioning of the ignition circuit while the closure is in any but fully closed position, and for preventing opening of the tank closure while the ignition circuit is closed, and I prefer to include signal means for indicating the open or closed condition of the tank.

A specific object of the invention is to provide electro-magnetically operated means for releasing a normally secured closure member, such as a fuel tank cap, the electro-magnetic means being controlled by a circuit including a battery so arranged that current flows in the releasing circuit only momentarily while the closure member is being released, thus reducing current consumption to a minimum. This obviously desirable end may be attained by associating with the manually operable switch which controls the closure releasing circuit a spring or equivalent means for urging the switch to open position immediately upon release of the manual element.

In addition to the foregoing briefly indicated characteristics and objects, the invention comprises an electrically controlled latch for the tank closure which may take the form of a bolt normally engaging the closure to secure it in closed position but electrically retractible under certain conditions to permit the closure to be removed.

Preferably I provide two locks for the system, one controlling the ignition circuit independently of the fuel tank closure, and the other cooperating with the first to control the fuel tank closure. The locks are preferably actuated by different keys. Hence if only the ignition key be possessed, the vehicle may be operated but the tank closure cannot be removed. This feature of the invention is of special importance when the vehicle is entrusted to repairmen, chauffeurs, etc., by whom the vehicle is to be operated but to whom it may be desirable to deny access to the fuel supply.

In this preliminary explanation and in the detailed disclosure hereinafter the invention is described as including a fuel tank closure controlled by one of the locks or latches which the system comprises. It is to be understood that this specific disclosure is by way of example only and that by making obvious and simple changes the lock or latch may be made to control some other instrumentality of the vehicle or its body. Such obvious modifications are considered well within the spirit of the invention and the scope and purview of the appended claims.

With the foregoing and other objects in view, the invention may be embodied in the form shown on the accompanying drawings, in which Figure 1 is an elevational view of the locks and signal which may be mounted on the instrument board of a vehicle;

From these drawings I have omitted, for the sake of clarity of illustration, the housings, cable armor and other customary protection against injury and tampering in which I enclose various parts of the construction in accordance with well known principles of practical design.

Figure 1:
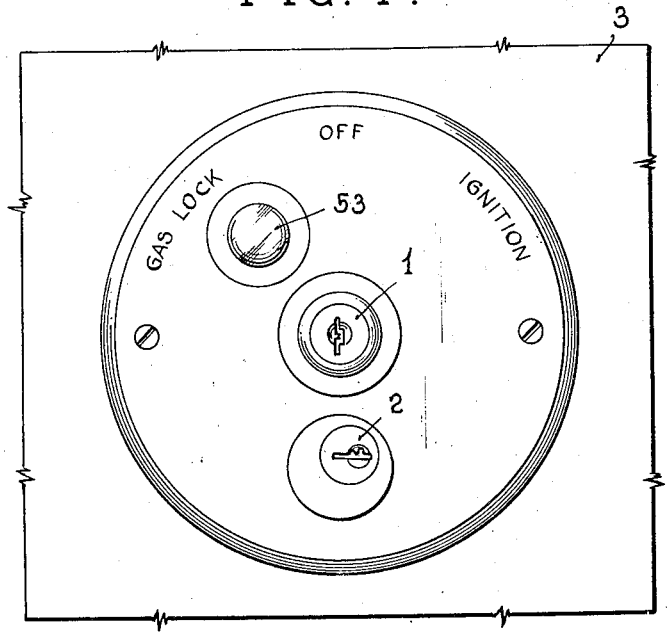

Referring to the drawings and first to Fig. 1, the reference numerals 1 and 2 indicate key controlled locks which may be mounted on an instrument board 3 of a vehicle. At the rear of lock 1 and movable only upon insertion and rotation of a key fitting the lock, is a switch 4 adapted to wipe contacts 5, 6, 7 and 8, so arranged that contacts 5 and 6 are bridged at one position of the switch and contacts 7 and 8 are bridged at a different position thereof.

Figure 2:
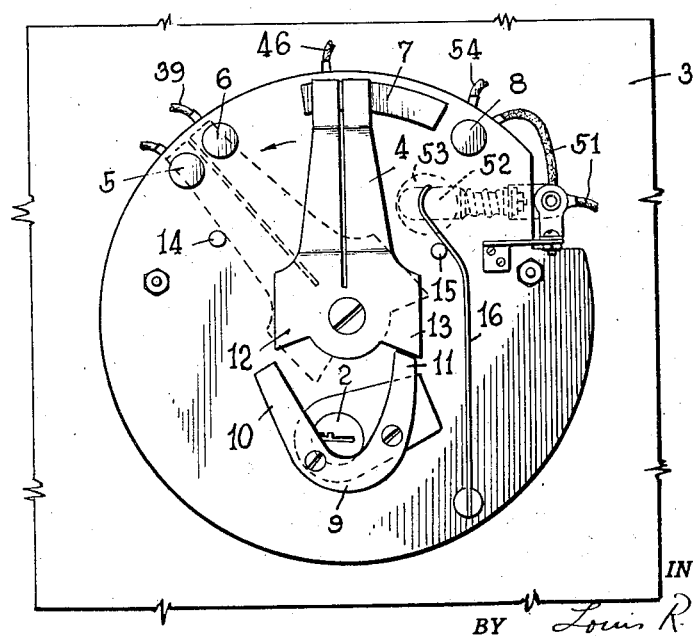
Fig. 2 is an elevational view showing a rear face of the parts shown in Fig. 1.
Figure 3:
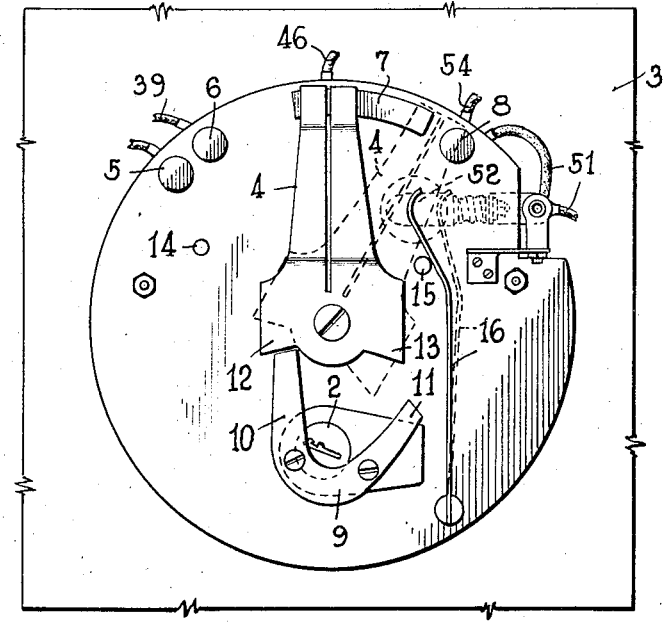
Fig. 3 is a view similar to Fig. 2 showing the parts in a different position.

With the switch is associated any appropriate means controlled by lock 2 for limiting movement of the switch at any time to either side but not both sides. In other words, means is provided to prevent movement of the switch toward the left when movement is permitted toward the right, and vice versa. A convenient embodiment of such means is illustrated in the form of a substantially U-shaped element 9 rotatable with the lock 2 under control of an appropriate key which is preferably different from that which fits lock 1. Lock 2 is arranged to rotate through a limited arc so as to bring one or the other of its two horns 10, 11, into engagement with stop faces 12, 13, formed conveniently integral with the switch 4 diametrically opposite its contact bridging portion. Figs. 2 and 3 show respectively horns 11 and 10 engaged with stop faces 13 and 12. In Fig. 2 the switch may be moved to bridge contacts 5 and 6 but not contacts 7 and 8, while in Fig. 3 the switch may be moved to bridge contacts 7 and 8 but not contacts 5 and 6.

Stop pins 14 and 15 may be provided on the member on which the switch and contacts are mounted to limit the range of movement of the switch and to limit movement toward the switch of a leaf spring 16 mounted on the supporting member and adapted to be distorted against its inherent resilience by rotation of the switch into bridging relation with contacts 7 and 8 in such a way that the switch is automatically moved out of engagement with contact 8 upon release of the key which controls lock 1. Thus, any bridging of contacts 7 and 8 is made momentarily only, unless the key which controls lock 1 be held at the extreme of its counterclockwise range of movement against the resilience of spring 16.

The foregoing description completes the explanation of the switch and appurtenant elements which control the circuits for the ignition and the other instrumentality of the vehicle which is intended to be secured, illustrated in this disclosure as the closure cap of the usual fuel tank. The switch and related elements as described hereinabove may be mounted on the instrument board of the vehicle or in any other convenient location, being connected by suitable electric conductors with the battery, ground, and mechanism controlling the other instrumentality intended to be secured, as hereinafter described.

Figure 4:
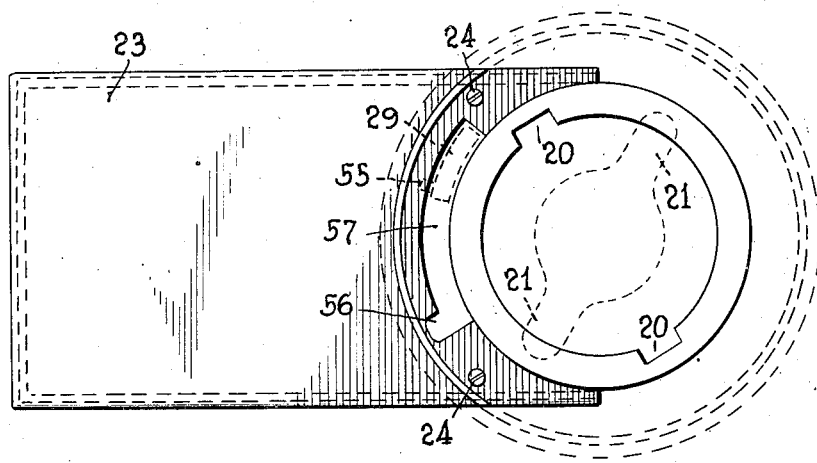
Fig. 4 is a plan view of a fuel tank neck and associated housing containing the closure latch and its operating parts.
Figure 5:
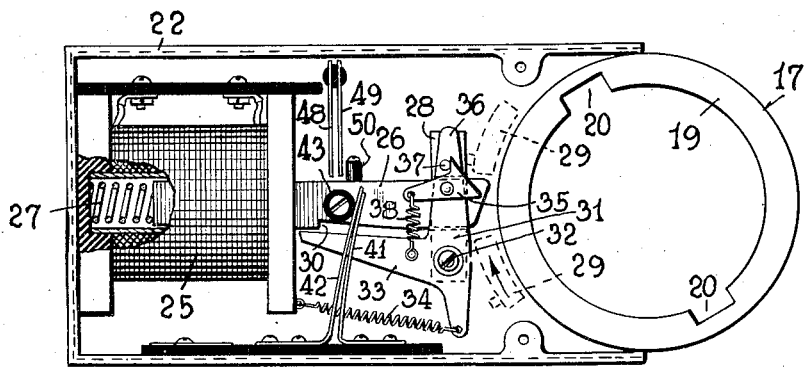
Fig. 5 is a similar view with the cover plate of the housing removed.
Figure 8:
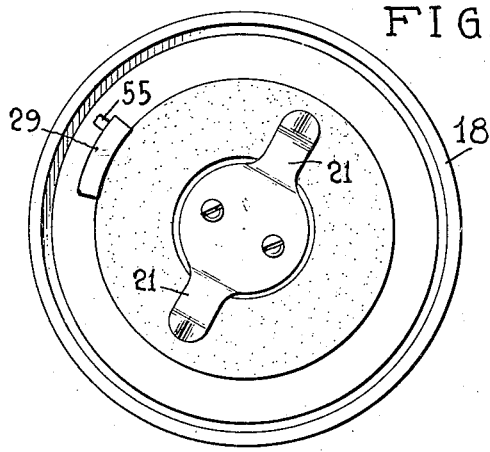
Fig. 8 is a plan view of the bottom of a fuel tank closure.
Figure 9:
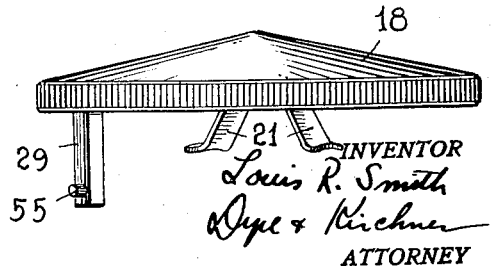
Fig. 9 is a side elevational view of the fuel tank closure.
Figure 6:
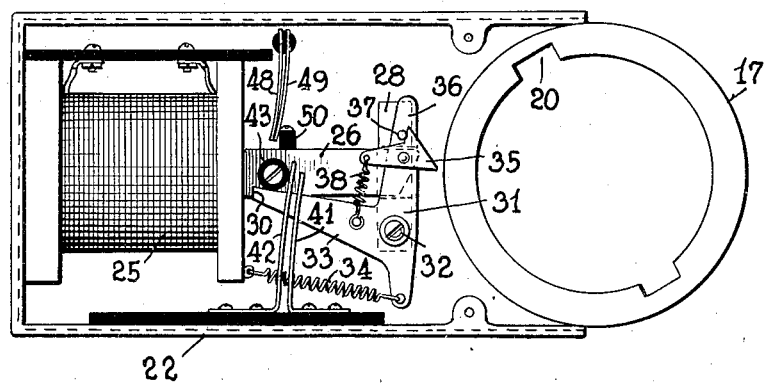
Fig. 6 is a view similar to Fig. 5 showing the operating parts in a different position.

If the other instrumentality intended to be secured against opening or removal be the closure cap of the customary fuel tank, the invention comprises providing an arrangement of parts and elements at the fuel tank substantially as follows:

In Figs. 4, 5 and 6 the reference numeral 17 designates the usual filling neck of the fuel tank 10 adapted to be closed by a cap 18. A convenient mode of connecting the cap to the neck consists in providing the neck with a radially inwardly extending flange 19 oppositely notched at 20, 20 to receive oppositely directed prongs 21, 21, carried by the cap. It is obvious that insertion of the prongs into the notches and rotation of the cap through a few degrees will result in engaging the prongs beneath the unnotched portion of the flange 19 to secure the cap on the neck. Obviously cooperating screw threads may be provided on the neck and cap, or any of numerous other well known expedients may be employed.

A box-like housing 22 is provided on the tank adjacent the neck normally closed by a cover plate 23 slit endwise onto the housing and bolted thereto at 24 under the peripheral margin of the cap 18 in such a way that when the cap is in place on the neck access cannot be had to the bolts which secure the cover plate in place.

The housing 22 contains the mechanism which controls the removability of the cap 18, in one position locking it against removal and in another position leaving it free to be removed. This mechanism may comprise a solenoid 25 having a core 26 urged outwardly of the solenoid and toward the neck 17 by a spring 27 under compression in the bore of the solenoid. The nose of core 26 extends through an aperture in a guide 28 mounted in the housing in such a manner that when in its extreme extended position it lies in the path through which an extension 29 depending from the under side of the cap 18 moves when the cap is rotated incident to being removed from the neck 17 or replaced thereon. The end of the nose is provided with a square side which opposes the side of extension 29 when the cap is locked on the neck and is rotated in the direction required for its removal. It is thus evident that when the core 26 is in its fully extended position the cap cannot be rotated on the neck from its closed to its open position.

In order to permit the cap to be turned from closed to open position core 26 is withdrawn into the solenoid by closing the circuit thereto as will be hereinafter explained.

In order to hold the core in its withdrawn position for purposes and with results hereinafter more fully developed, the core is notched at 30 on one side and a pawl 31 in the form of a bellcrank is pivoted at 32 on guide 28 at the same side of the core. One arm 33 of the bellcrank extends parallel to the core and is urged thereagainst by a spring 34 which may be conveniently connected between the bellcrank and some fixed part of the mechanism such as the spool of the solenoid. Hence, when the core is retracted into the solenoid arm 33 of the bellcrank enters notch 30 and holds core 26 withdrawn against the tension of spring 27. If the cap 18 be then in closed position on the neck 17 it may be rotated to open position.

In this relation of the parts, in order to cause restoration of cap 18 to closed position to release core 26 so as to lock the cap again in closed position, I provide a pawl 35 pivoted on arm 36 of bellcrank 31 and having an inclined face presented to extension 29 of the cap when the cap is moved from its closed to its open position. The face of pawl 35 presented to extension 29 when the cap 18 is moved from its open to its closed position is substantially square and tends to oppose such movement, but the face is so formed that pressure of extension 29 against it moves pawl 35 against the stop pin 37 formed on arm 36 of the bell-crank so that pawl 35 and bellcrank 31 moves as a unit, bellcrank 31 rotating about its pivot 32 to remove its arm 33 from notch 30 and permit core 26 to move outwardly under the influence of spring 27. A small coil spring 38 may connect the rear end of pawl 35 with bellcrank arm 33 to maintain the beveled and substantially square faces of the pawl forwardly extended into the path of movement of extension 29.

It is believed that the mechanical functioning of the various parts of the mechanism enclosed in housing 22 is made clear by the foregoing description. The circuit connections by which core 26 is retracted and by which the mechanism in the housing 22 cooperates with the ignition circuit to effect the objects and advantages hereinbefore indicated will now be described.

Figure 7:
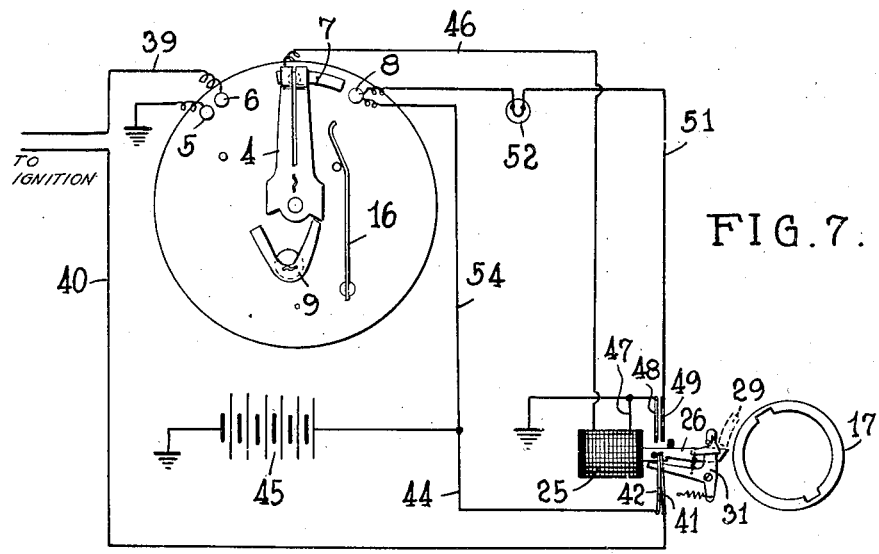
Fig. 7 is a diagram showing the several circuits.

Fig. 7 shows the circuit connections. Contact 5 is grounded, and a contact 6 is connected to one lead 39 from the ignition circuit, the other lead 40 of which is connected to a spring contact 41 mounted in the housing 22 and adapted, when core 26 moves forward, to have a similar spring contact 42 moved into engagement with it by an insulated stud 43 carried by the core. A lead 44 extends from contact 42 to the ungrounded terminal of the usual motor vehicle battery 45. It is evident that the ignition circuit becomes closed when switch 4 bridges contacts 5 and 6 and core 26 is extended to its position which latches cap 18 on neck 17.

From contact 7 a lead 46 extends to the solenoid winding, and from the winding a lead 47 branches, one branch being grounded and the other branch terminating at a spring contact 48 mounted in housing 22 and adapted to have a similar spring contact 49 moved into engagement with it by an insulated stud 50 carried by core 26. The relationship of contacts 48 and 49 and stud 50 is such that the contacts are open when core 26 is forwardly extended and closed when the core is retracted into the solenoid. From contact 49 lead 51 extends to contact 8, preferably first passing through a tell-tale signal lamp 52 mounted on the support which carries switch 4 and showing through a jewel lens 53 mounted close to lock 1. From contact 8 a lead 54 extends to the ungrounded terminal of battery 45.

It is believed that the foregoing detailed description makes the circuit connections clear.

The mode of operation and various capacities of the device will now be briefly indicated.

Let it be supposed that the cap 18 is closed on neck 17 and latched in place by engagement of its extension 29 with the square face of the nose of core 26, the keys being withdrawn from locks 1 and 2 and the parts shown in Fig. 2 being in their full line position in that figure. If an appropriate key be turned in lock 1 to rotate the switch to its dotted line position in Fig. 2 the ignition circuit is completed, including battery 45, lead 44, closed contacts 41 and 42, lead 40, the various ignition elements associated with the motor (not shown), lead 39, contact 6, switch 4 and grounded contact 5.

If it is desired to remove cap 18, solenoid 25 must be energized, and since open contacts 7 and 8 are in the solenoid circuit it is necessary to move switch 4 to bridge these contacts. This requires opening of the ignition contacts 5 and 6 and consequently results in stopping the vehicle engine.

If switch 4 is to be moved to bridge contacts 7 and 8 the element 9 must be rotated from its Fig. 2 to its Fig. 3 position, requiring possession of a key fitting lock 2. Removal of cap 13 is thus dependent on possession of a key fitting lock 2, which is preferably different from the key fitting lock 1, so that repairmen, chauffeurs and other persons authorized merely to drive the vehicle and not to have access to the fuel supply may be provided with a key fitting lock 1 only.

If lock 2 be operated to move element 9 to the position shown in Fig. 3 switch 4 may be turned to the position there shown in dotted lines. Contacts 7 and 8 become closed only as long as the key controlling lock 1 is forcibly against the resilience of spring 16, the spring opening contacts 7 and 8 immediately upon release of the key in lock 1. Excessive drain on the battery consequent upon prolonged consumption of the relatively large amount of current required to energize solenoid 25 is thus obviated. When contacts 7 and 8 are bridged by switch 4 current flows from battery 45 through lead 54, contact 8, switch 4, contact 7, lead 46, solenoid 25, lead 47, and its grounded branch, energizing the solenoid and retracting core 26 to the point where arm 33 of bellcrank 31 enters notch 30 of the core and holds it in retracted position, as shown in Fig. 6. Cap 18 may then be removed. Retraction of core 26 and its retention in the position shown in Fig. 6 closes contacts 48 and 49. Notwithstanding the opening of contacts 7 and 8 under the influence of spring 16 a circuit is completed through the tell-tale signal lamp 52, this circuit comprising battery 45, lead 54, contact 8, lamp 52, lead 51, closed contacts 49 and 48, and the grounded branch of solenoid lead 47. Obviously this circuit remains closed and lamp 52 consequently lit as long as core 26 remains retracted. Jewel lens 53 thus becomes a definite visual indication that cap 18 is not latched in closed position.

In order to prevent closing the ignition circuit while the cap 18 is removed or in unlatched closed position, the parts being in the relative positions just described, the ignition circuit is automatically opened and maintained open by retraction of core 26 to the position shown in Fig. 6 by the separation of contacts 41 and 42 consequent upon initial movement of the stud 43 which held these contacts together when core 26 was in its extended position. Thus, even though switch 4 be moved to close contacts 5 and 6 in the ignition circuit, the circuit is open at contacts 41 and 42 and the vehicle motor cannot be started. Consequently even a person in possession of keys fitting locks 1 and 2 cannot start the vehicle motor and operate the vehicle until cap 18 is restored to latched closed position on neck 17. It is impossible therefore to drive the vehicle from a filling station and inadvertently leave the fuel tank cap behind.

Since it may be desirable to extend the free end of extension 29 farther from cap 18 than prongs 21, I prefer to mount at the free end of extension 29 a small stud 55 which fits into a notch 56 formed in an end of an arcuate slot 57 in the cover plate 23. The cap can thus be applied to the neck only when stud 55 is passed through notch 56. Insertion of extension 29 behind the beveled face of pawl 35 is thus prevented. It is necessary to seat the cap on the neck in such a manner that rotation of the cap to closed position forces extension 29 past the substantially square face of pawl 35 to release bellcrank 31 and permit spring 27 to move core 26 into latching position.

As has been indicated hereinabove the invention has been described in a preferred embodiment and illustrated in a specific form merely for the purpose of disclosure. The invention may be embodied in other and further modified forms, not only as to the specific structure of the mechanism, but to the agencies and instrumentalities of the vehicle which are intended to be controlled. Such modifications to the extent that they embody the principles of the invention as pointed out by the appended claims are deemed within the scope and purview thereof.

I claim:

1. Vehicle locking means comprising a switch, contacts adapted to be closed by the switch to complete an ignition circuit, other contacts adapted to be closed by the switch to close a circuit adapted to release a latch, and a lock normally preventing movement of the switch to close the latch releasing contacts.

2. Vehicle locking means comprising a lock controlling an ignition circuit, a circuit including means for releasing a latch also controlled by said lock, and a second lock normally preventing actuation of the first lock to close the second named circuit.

3. Vehicle locking means comprising an ignition circuit and a latch releasing circuit, manually operable means for alternatively closing said circuits, and other means preventing operation of the manually operable means to close either circuit while the other circuit is closed.

4. Vehicle locking means comprising an ignition circuit and a latch releasing circuit, a switch controlling said circuits, and means movable to one position to prevent movement of the switch to close the ignition circuit and permit movement thereof to close the latch releasing circuit and movable to another position to prevent movement of the switch to close the latch releasing circuit and permit movement thereof to close the ignition circuit.

5. Vehicle locking means comprising an ignition circuit, a latch, a latch releasing circuit, manually operable means for alternatively closing said circuits, and other means preventing operation of the manually operable means to close the ignition circuit while the latch is in released position.

6. Vehicle locking means comprising an ignition circuit, a latch, a latch releasing circuit, means for alternatively closing said circuits, and means opening the ignition circuit upon release of the latch.

7. Vehicle locking means comprising an ignition circuit, a lock therefor, means carried by the vehicle, a latch for said means, and means cooperating with the latch and with the ignition circuit for opening the ignition circuit responsive to withdrawal of the latch.

8. Vehicle locking means comprising an ignition circuit, a fuel tank, a cap therefor, a latch mounted on the tank and engageable with the cap to prevent removal thereof, means for withdrawing said latch from such engagement, and means responsive to said withdrawal adapted to open the ignition circuit.

9. Vehicle locking means comprising a fuel tank, a cap therefor, a latch mounted on the tank and engageable with the cap to prevent removal thereof, means for withdrawing said latch from such engagement, an ignition circuit, and contacts in said circuit cooperating with said latch adapted to be closed when the latch is engaged with the cap and opened by withdrawal of the latch therefrom.

10. Vehicle locking means comprising a fuel tank, a cap therefor, a latch mounted on the tank and engageable with the cap to prevent removal thereof, means for withdrawing said latch from such engagement, an ignition circuit, a pair of contacts in said circuit biased to open position, and means carried by the latch adapted to close said contacts when the latch is engaged with the cap.

11. Vehicle locking means comprising a fuel tank, a cap therefor, a latch carried by the tank and engageable with the cap for preventing removal thereof, means urging the latch to such engagement, means for withdrawing the latch to permit removal of the cap, a pawl mounted adjacent the latch for holding the latch withdrawn, and means engageable by the cap for releasing said pawl when the cap is restored to closed position.

12. Vehicle locking means comprising a fuel tank, a cap therefor, a latch carried by the tank and engageable with the cap for preventing removal thereof, a spring urging the latch to such engagement, electro-magnetic means for withdrawing the latch to permit removal of the cap, means for holding the latch withdrawn automatically upon withdrawal, and means operable by restoration of the cap to fully closed position to release the holding means.

13. Vehicle locking means comprising a fuel tank, a cap therefor, a latch carried by the tank and engageable with the cap for preventing removal thereof, a spring urging the latch to such engagement, electro-magnetic means for withdrawing the latch to permit removal of the cap, a pawl, a spring urging the pawl into holding engagement with the latch when the latch is withdrawn, and means carried by the pawl engageable by the cap for releasing the pawl when the cap is moved to closed position.

LOUIS R. SMITH.